United States Patent [19]

Gouali

[11] Patent Number: 4,621,894

[45] Date of Patent: Nov. 11, 1986

[54] A DEVICE FOR DISTRIBUTING LIGHT ENERGY INCLUDING AT LEAST ONE INLET FIBER WITH A CHAMFERED OUTLET END AND A DIFFRACTION GRATING, AND APPLICATION THEREOF TO OPTICAL SWITCHING

[75] Inventor: Mohamed Gouali, Paris, France

[73] Assignee: Lignes Telegraphiques et Telephoniques L.T.T., France

[21] Appl. No.: 744,366

[22] Filed: Jun. 13, 1985

[30] Foreign Application Priority Data

Jun. 13, 1984 [FR] France ................. 84 09199

[51] Int. Cl.⁴ ............................... G02B 6/34
[52] U.S. Cl. ..................... 350/96.19; 350/96.15
[58] Field of Search ............. 350/96.15, 96.16, 96.18, 350/96.19

[56] References Cited

U.S. PATENT DOCUMENTS

| | | | |
|---|---|---|---|
| 4,381,882 | 5/1983 | Sabine | 350/96.15 X |
| 4,387,955 | 6/1983 | Ludman et al. | 350/96.19 |
| 4,484,795 | 11/1984 | Byron | 350/96.19 |
| 4,487,475 | 12/1984 | Ogawa | 350/96.21 |

FOREIGN PATENT DOCUMENTS 0155902 12/1981 Japan ................. 350/96.19

OTHER PUBLICATIONS

Gillham, F. "Designer's Handbook: Fiber Optic Couplers for Multiplexing", Photonics Spectra, vol. 18, No. 4 (Apr. 1984), pp. 45–52.
Watanabe, R., "Optical Grating Multiplexer in the 1.1–1.5 μm Wavelength Region", Electronics Letters, vol. 16, No. 3, Jan. 31, 1980, pp. 108–109.

Primary Examiner—William L. Sikes
Assistant Examiner—Lester Rushin
Attorney, Agent, or Firm—Sughrue, Mion, Zinn, Macpeak and Seas

[57] ABSTRACT

A device for distributing light energy comprises a chamfered inlet fiber (2) which is coupled to a plurality of outlet fibers (3) which are grouped together in a matrix. The coupling is performed by a diffraction grating (5) which is inclined relative to the chamfered inlet fiber at such an angle that the diffracted beam is a parallel beam, and the matrix of outlet fibers is disposed on the path of said outlet beam. Such a device is applicable to optical fiber distribution systems.

6 Claims, 7 Drawing Figures

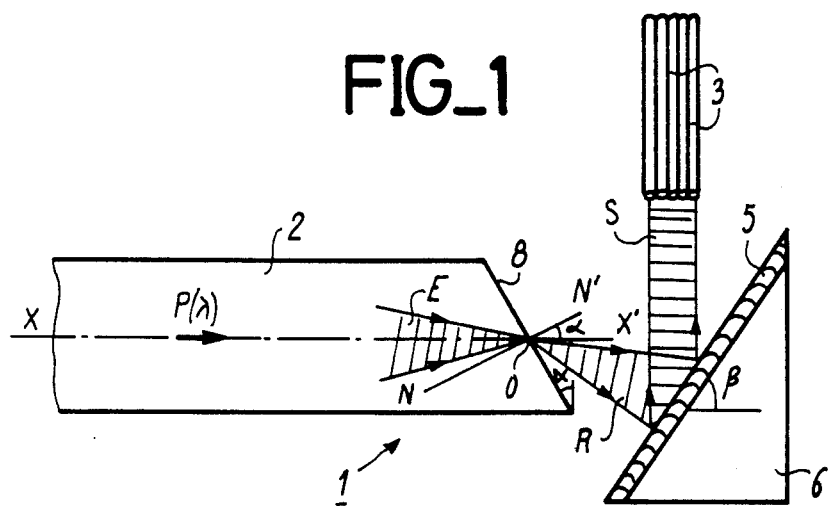
FIG_1
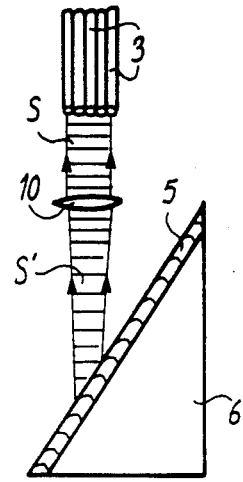
FIG_4
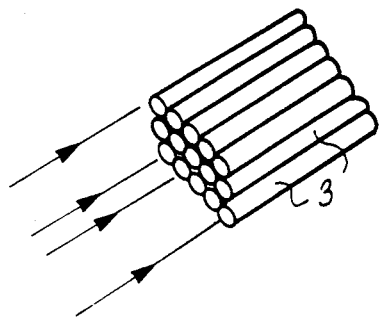
FIG_2
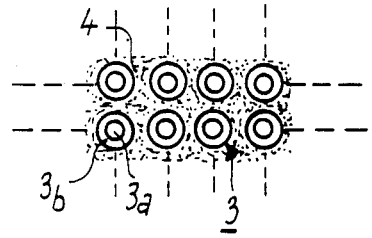
FIG_3-a
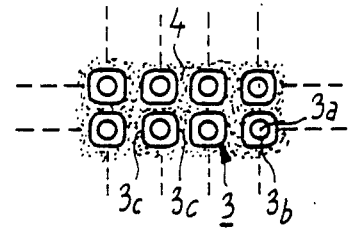
FIG_3-b

FIG_5
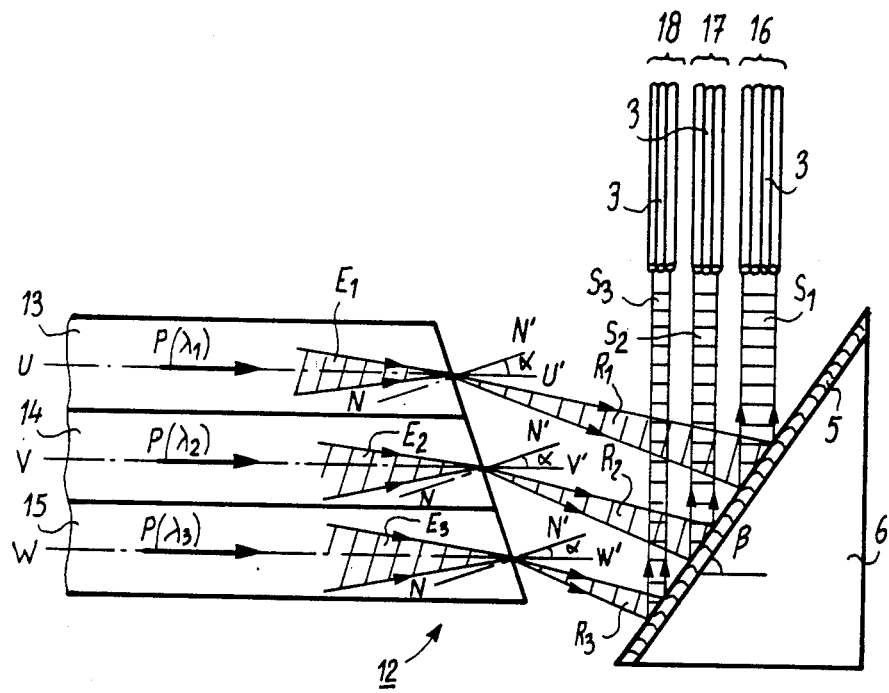
FIG_6
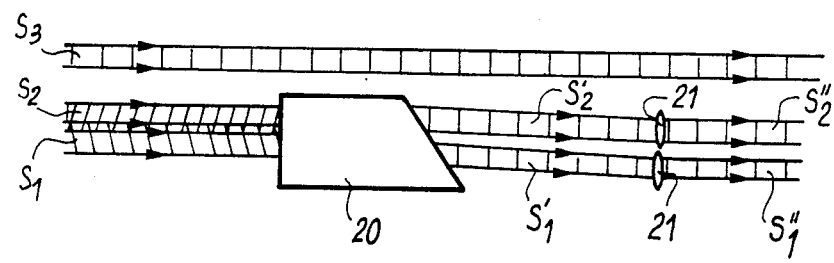

A DEVICE FOR DISTRIBUTING LIGHT ENERGY INCLUDING AT LEAST ONE INLET FIBER WITH A CHAMFERED OUTLET END AND A DIFFRACTION GRATING, AND APPLICATION THEREOF TO OPTICAL SWITCHING

The present invention relates in a general manner to optical fiber telecommunications systems, and relates more particularly to a device for distributing light energy together with the application of said device to optical switching.

BACKGROUND OF THE INVENTION

In optical telecommunications systems, it is often necessary to distribute a single light signal from one or more optical fibers between a plurality of other optical fibers. Important considerations for a device performing such a function include obtaining as many distribution paths as possible, and its insertion losses.

U.S. Pat. No. 4,285,570 describes one type of light energy distributing device using optical fibers. This device employs a self-focusing lens of the SELFOC (registered trademark) type comprising a bar of refractive material such as glass, for example, having an index gradient therein. In said device, a plurality of optical fibers which are fixed side-by-side to one another are coupled to a first face of a lens, and a reflective coating is deposited on a second face of the lens opposite to the first face. One of said fibers constitutes an inlet fiber and conveys an incident light wave which penetrates into the lens and propagates therethrough. After reflection on said second face of the lens, the light beam leaves the lens through its first face and is thus distributed amongst the other fibers which constitute outlet fibers.

However, such a light energy distribution device possesses several drawbacks. Firstly, since the inlet fiber is located on the same side of the lens as the outlet fibers, a portion of the light energy leaving the lens also enters into the inlet fiber, thus constituting a light "echo" to the inlet fiber which causes disturbances therein. Secondly, this device suffers from numerous Fresnel losses as the fiber/lens interface and also at the covering on the second face of the lens. Further, the number of outlet or distribution paths is limited by the size of the cross-section of the lens, and finally maximal coupling between the fibers and the lens is difficult to achieve.

Preferred embodiments of the present invention remedy these drawbacks by providing a device enabling a single light signal from an inlet optical fiber to be distributed over a large number of outlet optical fibers, and with the inlet fiber being completely isolated from the outlet fibers.

SUMMARY OF THE INVENTION

The present invention provides a light energy distributing device comprising at least one inlet optical fiber for receiving light energy, and a plurality of outlet optical fibers over which said light energy is distributed, the device including the improvement whereby the outlet end of the inlet fiber is chamfered at a given angle $\alpha$ to refract the light beam emerging therefrom, the device further including a diffraction grating suitable for receiving the light beam emerging from the inlet fiber and inclined relative to the chamfered outlet end of the inlet fiber at an angle $\beta$ such that the diffracted outlet light beam becomes a substantially parallel beam, said outlet fibers being disposed on the path of said parallel beam to receive light energy therefrom.

The invention also provides an application of said light energy distribution device to light switching of a large number of paths, by cascading a plurality of inlet fibers and a plurality of sets of outlet fibers.

BRIEF DESCRIPTION OF THE DRAWINGS

Embodiments of the invention are described by way of example with reference to the accompanying drawings, in which:

FIG. 1 is a section through a light energy distribution device in accordance with the invention;

FIG. 2 is a perspective view of outlet fibers grouped in a matrix configuration;

FIGS. 3a and 3b are two cross-section views through two different matrix configurations of outlet fibers;

FIG. 4 is a section through a diffraction grating and the outlet fibers for an embodiment in which the diffraction grating produces a slightly divergent light beam;

FIG. 5 is a section through an optical switch; and

FIG. 6 is a section through light beams at the outlet from the diffraction grating shown in FIG. 5, in the event that the diffracted light beams are mixed.

In these figures, the same references are used to designate the same items or items performing the same functions in order to obtain the same results.

MORE DETAILED DESCRIPTION

FIG. 1 is a section through a device 1 in accordance with the invention for distributing a single light signal having a given wavelength and coming from an inlet optical fiber 2 over a plurality of identical outlet optical fibers 3.

The inlet fiber 2 is a multimode step-index silica type, such as a 100/140 micron fiber having a numerical aperture of about 0.29. A light wave propagates inside said fiber and is given the symbolic reference $P(\lambda)$. This wave is emitted by a light emitting diode (LED, not shown) at a given wavelength $\lambda$, which may be equal to 1.3 microns, for example.

The outlet fibers 3 are 50/125 micron multimode silica fibers having an index gradient, or preferably they are 5/125 micron monomode fibers in order to obtain a high number of outlet channels. As is explained below, each of these fibers is coupled to the inlet fiber in such a manner as to receive the light radiation $P(\lambda)$ guided by the inlet fiber.

In order to enable said light energy to be distributed over the outlet fibers 3, the outlet fibers are grouped together in a matrix configuration and are fixed side-by-side, i.e. their respective optical axes are parallel. FIG. 2 shows one such matrix of fibers 3 in which the numbers of lines and columns are given purely by way of example and should not be taken as being limiting.

The various outlet fibers 3 are fixed to one another in either of the two manners shown in FIGS. 3a, 3b, respectively. Each of these figures shows a portion of the matrix of outlet fibers in cross-section, and each fiber is represented by its core 3a and its optical cladding 3b.

In a first variant shown in FIG. 3a, the various fibers 3 of the matrix are glued to one another side-by-side using an epoxy resin having a refractive index matching that of the fibers, i.e. which is equal or very close thereto. Thus, by way of example, the refractive index of the silica may be 1.45 and the refractive index of the chosen epoxy resin is equal to 1.47.

FIG. 3b shows a second, and preferred, variant in which the various adjacent portions of the fibers in the matrix are initially abraded through part of their cladding thickness, as shown at 3c, and the abraded portions of the fibers are then reconstituted by an epoxy resin 4 having a matching refractive index, said resin also serving to glue the fibers to one another.

This variant has the advantage of enabling the various fibers to be brought very close together, thereby reducing losses and also ensuring uniform distribution of light energy over said fibers.

As can be seen in FIG. 1, the outlet fibers 3 grouped together in their matrix, are coupled to the inlet fiber 2 by means of an intermediate optical elements constituted by a holographic type diffraction grating 5 of conventional structure. This diffraction grating is, for example, an inclined plane grating operating by reflection and mounted on a glass support 6.

In accordance with one aspect of the invention, the inlet fiber 2 has an outlet face 8 which is chamfered at a given angle $\alpha$ between its longitudinal axis XX' and the normal NN' to the emission face. Thus, depending on the value given to the chamfer angle $\alpha$, the light energy guided by the inlet fiber 2 and represented symbolically in FIG. 1 by a beam E projected on the center O of the emission face of the fiber 2 is offset on leaving the chamfered end face of the fiber as is well known to the person skilled in the art. Reference R in FIG. 1 represents the refracted beam leaving the center O of the chamfered face 8 of the inlet fiber.

In order to distribute the light energy coming from the inlet fiber 2 to all the outlet fibers 3 disposed in their matrix, the diffraction grating 5 is inclined relative to the axis XX' of the fiber at an angle B such that the diffracted light beam, represented symbolically by S in FIG. 1, is a parallel beam i.e. is a non-divergent beam. All of the outlet fibers 3 are mutually parallel and are located on the path of the parallel beam S which thus penetrates into each of said outlet fibers.

Thus, the two parameters to be taken into consideration for distributing the light radiation from the inlet fiber are firstly the chamfer angle $\alpha$ by which the light beam leaving the inlet fiber is deflected, and secondly the angle of inclination $\beta$ of the diffraction grating in order to obtain non-diverging diffraction of the deflected light beam. To this end, the two angles $\alpha$ and $\beta$ may be defined either by experiment or by performing conventional calculations in geometrical optics. From a practical point of view, it is preferable to begin by deciding on a chamfer angle $\alpha$, and then to determine the inclination angle $\beta$ of the grating relative to the axis of the inlet fiber such that the grating gives rise to a diffracted light beam which is as parallel as possible. Said angles $\beta$ is also determined as a function of various known parameters relating to diffraction gratings.

By way of example, good coupling between the inlet fiber and the outlet fibers has been obtained for a chamfer angle $\alpha$ equal to 25° and an inclination angle $\beta$ of about 15°. This embodiment enables a matrix of about 600 5/125 micron monomode outlet fibers to be coupled with a step index 100/140 micron inlet fiber.

As can be seen in FIG. 1, the outlet fibers 3 and the chamfered inlet fiber 2 are disposed without coming into direct contact with the optical grating and at an inverse inclination to that of the inlet fiber, thus forming together with the grating a prism model in air.

It may be observed that the number of outlet channels may be increased by disposing a plurality of inlet fibers side-by-side, each of said fibers being chamfered with the same given angle and each transmitting light signals at the same wavelength, thereby obtaining an incident light beam which is of wider cross-section on the diffraction grating, which beam is then diffracted into a parallel beam of similarly greater cross-section.

FIG. 4 shows the case of a diffracted beam S' which is not exactly parallel, for example because the diffraction grating 5 is not ideally oriented relative to the inlet fiber. In this case, the resulting slight divergence of the beam may be corrected by means of a conventional collimator lens 10 at the outlet of which a genuinely parallel beam S is provided and is distributed to all the outlet fibers 3, as before.

The basic structure of the light energy distributing device as described above may be used for optically switching a large number of channels, in other words a light signal of given wavelength transmitted by one out of N optical inlet fibers may be conveyed to one or more optical fibers of a single set selected from N sets of fibers.

FIG. 5 shows one such optical switch 12 having, by way of non-limiting example, three identical inlet fibers 13, 14 and 15, together with three identical sets of outlet fibers 16, 17 and 18, each of which comprises a matrix grouping and each of which is referenced 3.

As can be seen from FIG. 5, the three inlet fibers 13, 14 and 15 transmit light waves referenced symbolically as $P(\lambda_1)$, $P(\lambda_2)$ and $P(\lambda_3)$ which are emitted at given wavelengths $\lambda_1$, $\lambda_2$ and $\lambda_3$. These waves are intended to be received selectively by the three sets of outlet fibers 16, 17 and 18. The three different wavelengths used are respectively equal to 0.76 microns, 0.90 microns, and 1.3 microns, for example.

In order to provide optical switching, the three inlet fibers are in side-to-side contact and are fixed to one another by means of an epoxy resin, for example. Their ends are chamfered to a given angle between their respective longitudinal axes UU', VV', and WW' and the normal to their respective emission faces. For reasons of available space, it is preferable for all three inlet fibers to have the same chamfer angle $\alpha$ as shown in FIG. 5 between the optical axis of each fiber and the normal NN' to its emission face.

As with reference to FIG. 1, each of the three light beams coming from the inlet fibers, and symbolically referenced $E_1$, $E_2$, and $E_3$, emerges from its respective chamfered inlet fiber after being deflected by an amount controlled by the chamfer angle $\alpha$. The three refracted light beams are symbolically referenced $R_1$, $R_2$, and $R_3$, and these beams are projected on the diffraction grating 5 which is of the same structure as that described with reference to FIG. 1.

The diffraction grating 5 thus separates the three incident beams $R_1$, $R_2$, and $R_3$ by acting selectively as a function of the three wavelengths $\lambda_1$, $\lambda_2$, and $\lambda_3$. Further, the grating is inclined relative to the three inlet fibers at an angle $\beta$ which is determined as before, such that the three diffracted beams, symbolically referenced $S_1$, $S_2$, and $S_3$, are parallel beams which are separate from one another. As before, each of the three sets of outlet fibers grouped in matrices 16, 17 and 18, is disposed on the path of the associated parallel beam. Thus, by this disposition, the various light energies transmitted by the inlet fibers are separated by virtue of their wavelengths by the diffraction grating 5 and are selectively distributed to the different sets of outlet fibers.

In FIG. 5, the three diffracted light beams $S_1$, $S_2$, and $S_3$ at different wavelengths $\lambda_1$, $\lambda_2$, $\lambda_3$ are completely separate from one another. However, a degree of mixing between these light beams may occur on leaving the diffraction grating.

FIG. 6 shows the case where two of these three diffracted light beams $S_1$, $S_2$, and $S_3$ are mixed, i.e. in this example the beams $S_1$ and $S_2$ are mixed. In order to clarify the figure, it does not show the diffraction grating or the three matrices of outlet fibers.

In order to separate the two light beams $S_1$ and $S_2$, a prism 20 having a given uniform refractive index is placed on the path of these two light beams which are therefore deflected after leaving the grating, as shown at $S'_1$ and $S'_2$ in FIG. 6. In the event that these two separated light beams $S'_1$ and $S'_2$ are slightly divergent, conventional lens 21 may be placed on their paths in order to correct said divergence and to obtain two parallel beams $S''_1$ and $S''_2$.

I claim:

1. In a light energy distributing device comprising at least one optical inlet fiber for receiving light energy, and a plurality of outlet optical fibers over which said light energy is distributed, the improvement wherein the outlet end of said at least one inlet fiber is chamfered at a given angle $\alpha$ to refract the light beam emerging therefrom, and said device further including a diffraction grating positioned to receive the light beam emerging from said at least one inlet fiber and inclined relative to the axis of said at least one inlet fiber at an angle $\beta$ such that the diffracted outlet light beam becomes a substantially parallel beam, and said plurality of outlet fibers being disposed on the path of said parallel beam to receive light energy therefrom.

2. A device according to claim 1, wherein the outlet optical fibers are disposed in the form of a matrix and are fixed together side-by-side.

3. A device according to claim 2, wherein the outlet optical fibers are fixed to one another by means of a resin having a refractive index which matches the refractive index of the fibers.

4. A device according to claim 1, wherein the diffraction grating is a plane grating operating by refraction.

5. The light energy distributing device as defined by claim 1, wherein said at least one inlet fiber comprises a set of inlet optical fibers, said plurality of outlet fibers comprise a plurality of sets of outlet fibers, said device switches different optical signals of given wavelengths transmitted by said set of inlet optical fibers for selective reception by said plurality of sets of outlet fibers, wherein said inlet fibers are in side-by-side contact, wherein each of said inlet fibers has an outlet face chamfered to a given angle, said diffraction grating receiving the various light beams emerging from said chamfered inlet fibers, and wherein each set of outlet fibers is disposed on the path of one of the different parallel beams as diffracted by the grating.

6. An application according to claim 5, wherein all of the inlet fibers are chamfered by the same angle $\alpha$.

* * * * *